UNITED STATES PATENT OFFICE.

JAMES E. ATWOOD, OF BROOKLYN, NEW YORK.

PROCESS OF PURIFYING IRON AND STEEL.

SPECIFICATION forming part of Letters Patent No. 304,773, dated September 9, 1884.

Application filed December 3, 1883. (Specimens.)

*To all whom it may concern:*

Be it known that I, JAMES E. ATWOOD, a citizen of the United States, residing at Brooklyn, in the county of Kings and State of New York, have invented new and useful Improvements in Process of Purifying Molten Iron or Steel, of which the following is a specification.

My invention has for its object to produce an improved metal in character possessing increased tensile strength, ductility, and density, and in grain resembling the finest steel; and to that end it consists in the process hereinafter described.

In carrying out my invention I first combine quicksilver and common lead, varying in their proportions according to the quality of iron desired. I combine the quicksilver and lead by two processes in one. I treat the metals in a cold state by cutting the lead into very fine pieces, then adding the quicksilver and letting them stand sufficient time for them to unite. By the other process I apply heat in the following manner: I place the quicksilver and lead in a ladle or crucible under a covering of charcoal, as is the ordinary practice in combining metals. The proportions of these two ingredients, ordinarily, are one part of quicksilver to four parts of lead (although I diminish the quantity of lead when an iron of a specific character or quality is desired.) When thus placed in a crucible and covered with charcoal, I seal the crucible in any of the ordinary methods to exclude the air. I then subject the same to a heat varying from 200° to 400° Fahrenheit, and keep it under such heat until the quicksilver and lead are thoroughly combined with each other. Then the product is run off into molds and formed into ingots. This compound or amalgam is then infused into melted pig-iron or molten scrap or cast iron, or into melted steel, or into combinations of melted pig, cast, or scrap iron, wrought-iron, and steel, or infused into any one of these singly or in combination with all, or into one, two, or more, according to the quality of iron desired for different uses. For ordinary purposes, the quantity of this amalgam to be infused into one ton of iron or into one ton of the above-mentioned different qualities of iron is from one to five pounds. The infusion is completely effected by first reducing the iron to a molten state, then adding the amalgam, subjecting the mass in a suitable furnace to a heat of about 4,000° Fahrenheit. Under this treatment the amalgam of quicksilver and lead is not only diffused throughout the mass and equally distributed, but impurities are driven off, which in other preparations of iron or steel require laborious and expensive treatment. This treatment is continued until the metals are thoroughly incorporated with each other, which may be determined when the mass becomes "plain" and ceases to boil. The new metal thus formed is run off into molds. This new combination metal, resulting from the foregoing-described process, has about twice the strength of the best gun-metal, with a fine homogeneous grain closely resembling that of hammered steel, and will as readily temper in water as steel, and be turned and worked as well as steel. It will also take a high polish, and will oxidize but little as compared with other manufactures of steel or iron, and can be applied to almost every use to which the preparations of iron or steel are applied.

In case any of the varied preparations of this new metal should be found too hard for the use to which it is to be applied, it can be reheated or annealed.

I do not confine myself to the proportions and temperatures stated where others will answer the purpose especially desired, but have merely stated these proportions and temperatures as guides.

Having thus described my invention, what I claim is—

The process of purifying molten iron or steel, consisting in mixing quicksilver and lead, and then combining said amalgam with iron or steel by infusing the amalgam into either melted pig, cast, scrap, or wrought iron or steel, or combinations thereof, substantially as described.

In testimony whereof I have hereunto set my hand in the presence of two subscribing witnesses.

JAMES E. ATWOOD.

Witnesses:
 J. A. RUTHERFORD,
 JOS. L. COOMBS.